Feb. 10, 1959 R. E. FRICKS 2,873,315

AUTOMATIC START-STOP CIRCUIT FOR FACSIMILE RECORDERS

Filed March 30, 1955

Inventor
Richard E. Fricks
by Roberts, Cushman & Grover
Att'ys 2,873,315
Patented Feb. 10, 1959

2,873,315

AUTOMATIC START-STOP CIRCUIT FOR FACSIMILE RECORDERS

Richard E. Fricks, Bedford, Mass., assignor to Alden Products Co., Brockton, Mass., a corporation of Massachusetts Application March 30, 1955, Serial No. 497,892

12 Claims. (Cl. 178—69.5)

This invention relates to facsimile recorders which are automatically started when a facsimile signal is received and stopped when reception ceases, and particularly to systems wherein transmitted facsimile signals are electrically recorded on a moving strip of paper as it is fed between a stationary and a motor driven electrode.

When copy is transmitted intermittently it is desirable to place the recorders in a standby condition such that the aforesaid motor is not driven when signals are not being received. It is further desirable to provide means for automatically starting the recorder when signals are received without requiring the constant attendance of an operator. However, if automatic start-stop apparatus is complicated and unreliable in operation and draws substantial power it may well offset the advantages of automatic operation.

One object of the present invention, therefore, is to provide automatic start-stop apparatus which is easy to manufacture, which is simple and stable in operation and which draws little or no power when in standby condition.

For equipment which incorporates automatic framing devices for correcting phase error between the moving electrode and the facsimile signals, another object of the invention is to hold the framing means inoperative until the electrode driving motor has started.

In a broad aspect the invention involves a motor operated recorder adapted to receive transmitted facsimile signals which include portions recurring during transmission at regular intervals and relates to an automatic start stop circuit comprising means responsive to each of said recurring portions to convert it into a substantially constant control voltage, and relay means such as an electronic valve or an electromagnetic relay connected to the aforesaid responsive means and controlled by said voltage to complete a power connection to the motor so long as said portions recur substantially regularly. Where two or more motors are used with the recorder one or more of them may be caused to start and stop by the occurrence or non-occurrence of recurring portions of the facsimile signal such as the framing pulse or the video portion.

In a specific aspect the responsive means comprises pulse stretching means such as a multivibrator responsive to a cyclic pulse portion of the facsimile signals and operative to produce a relatively long pulse and an integrator or like storage means converting the long pulse to a substantially constant control voltage, the integrator being connected to the aforesaid relay means so that when the control voltage is applied to said relay means the motor is caused to start and run so long as said cyclic pulse recurs substantially regularly.

Preferably the aforesaid multivibrator has a half cycle which extends a substantial part of the period of said recurring cyclic pulses, and the aforesaid integrator has a time constant longer than said period or the interval between the recurring cyclic pulses.

While the relay means may be operative to complete a direct circuit to the recorder motor, in another specific aspect it completes a connection which includes framing means for synchronizing the phase of the motor with the facsimile signals once the motor is started, so that the framing means are not effective until the motor is caused to run.

For the purpose of illustration typical embodiments of the invention are illustrated in the accompanying drawing in which—

Figures 1, 2, 3:
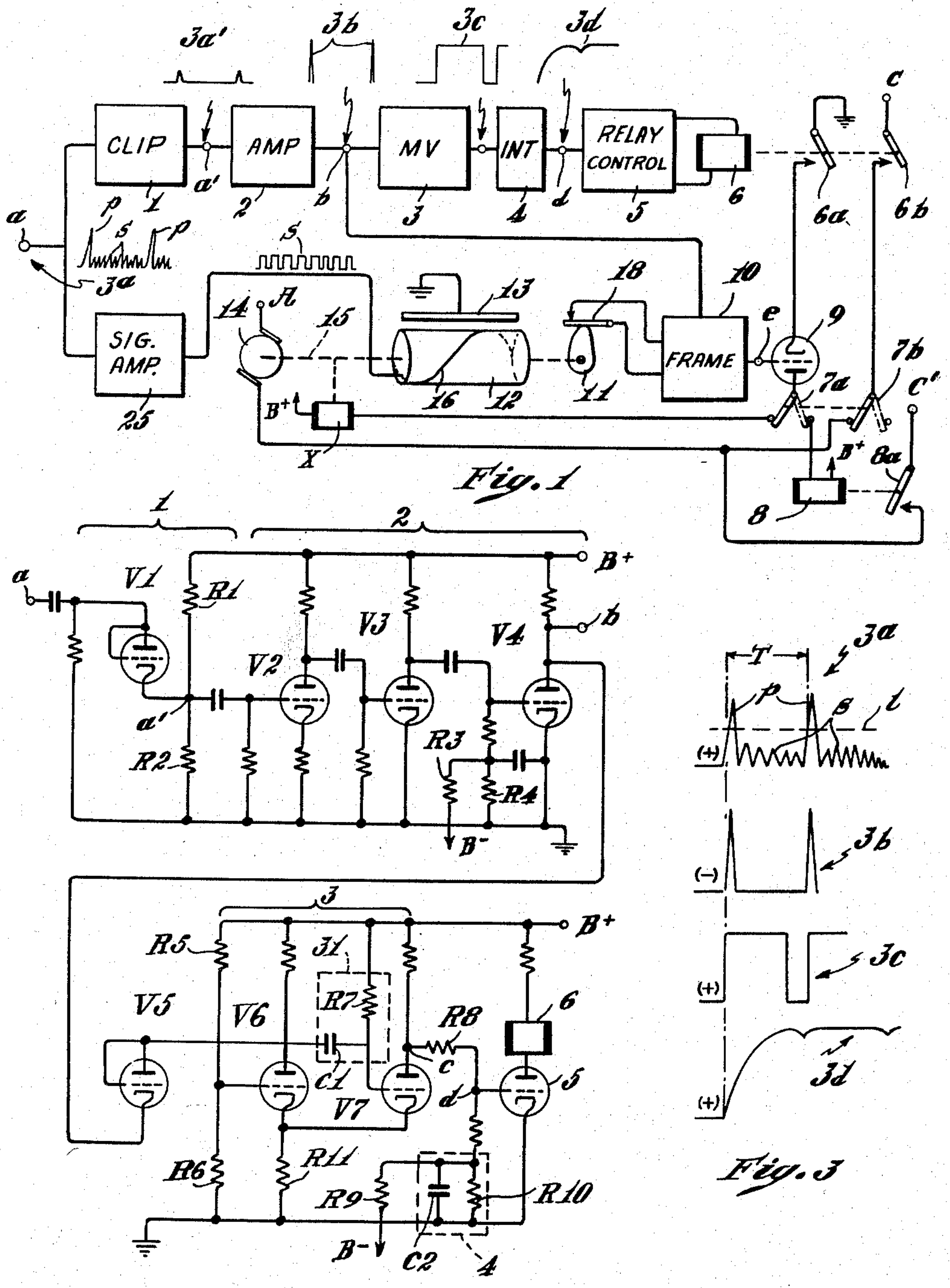
Fig. 1 is a diagram showing two alternate arrangements of the facsimile recorder.
Fig. 2 is a schematic diagram of a start-stop circuit.
Fig. 3 is a graphic representation of voltages occurring in the start-stop circuit.

As shown in Fig. 1 one type of recorder suitable for use with the present invention includes a rotating drum 12 carrying a conventional helical scanning electrode 16 which cooperates with a blade electrode 13 so as to mark a record on paper fed between the electrodes when current flows between the electrodes. The recorder drum 12 is driven by a motor 14 through a connection 15. A switch 18 is periodically opened and closed by a cam 11 driven in synchronism with the drum 12 and produces a signal known as a recorder pulse which is compared with the framing or sync pulse of facsimile signals for the purpose of synchronizing the motor 14 and drum 12 with the incoming facsimile signals.

Typical facsimile signals are illustrated by voltage 3*a* of Fig. 3 and comprise picture or video signals *s* of varying amplitude corresponding to the subject matter transmitted and synchronizing or framing pulses *p*. The synchronizing pulses *p* and the signal portions *s* recur at a regular interval or period T determined by the facsimile transmitter.

These transmitted signals 3*a* are applied to an input terminal *a* of the recorder. The picture signal portion *s* is amplified in a signal amplifier 25 and applied to the helical electrode 16 of the recorder drum 12.

The facsimile signals are also applied to a clipping stage 1 which passes only a portion of the framing pulse *p* which is higher than the cutoff level 1 (see Fig. 3) of the clipping stage 1. The output of this stage appearing at the terminal *a'* is a series of low amplitude cyclically recurring pulses 3*a'* having the same period T as the framing pulse *p*. These pulses 3*a'* are amplified and peaked in an amplifier 2 and appear as relatively high amplitude pulses 3*b* at the output terminal *b* of the amplifier 2. The amplified framing pulses 3*b* are applied to a one-cycle multivibrator 3 which produces a square wave voltage 3*c* at its output terminal *c* in response to each amplified framing pulse 3*b*. The duration of the square wave voltage 3*c* is preferably one-half to three-quarters the length of the interval or period T of the framing pulses *p*. The three voltages 3*a*, 3*b* and 3*c* are shown in Fig. 3. The square wave voltage is applied to an integrator 4 which converts the square wave voltage into a substantially constant voltage 3*b* as soon as and so long as the framing pulses *p* cause the one-cycle multivibrator 3 to produce the square waves 3*c*. The control voltage 3*d* is applied to a relay control circuit 5, to be explained more fully hereinafter, which controls the operation of a relay 6 having contactors 6*a* and 6*b*.

A two pole, two position switch 7*a*—7*b*, shown in Fig. 1, illustrates two ways in which the operation of the relay 6 may control the starting and stopping of the recorder drum motor 14. When the switch 7*b* is in the position shown in solid lines, the contactor 6*b* of relay 6 completes an alternating current circuit between power terminals A and C through the motor 14.

The operation of the automatic start-stop circuit so far described is as follows. When the facsimile transmitter begins operation facsimile signals are applied to the recorder input terminal *a*. The framing pulse *p* is clipped and amplified and used to trigger the one-cycle multivibrator 3. The square wave output of the multivibrator is integrated into a control voltage which causes energization of the relay 6. The closing of the contactor **6*b* applies power to the motor 14 causing the helix drum 12 to begin scanning the recording paper between the helix and the blade electrode 13. Should transmission of the framing pulse cease, the one-cycle multivibrator no longer is triggered, the control voltage 3*d* is removed from control stage 5 and relay 6 is deenergized opening the power circuit to the motor 14**.

With reference to Fig. 1 it will be seen that the amplified framing pulse at terminal *b* is also applied to a framing circuit 10 of the coincidence type such as is shown in U. S. Patent No. 2,632,810 to A. Nyman or in my copending application Serial No. 270,824, filed February 9, 1952. The framing circuit 10 compares the recorder pulse produced by the switch 18 and the amplified framing pulse **3*b*** and produces a framing voltage at its output *e*. This voltage is applied through a switching tube 9 to a framing device X if the connections are as indicated by the full line position of switch **7*a*. The framing device X may be any one of many known devices such as an electromagnetic coupling in the driving connection 15 between the motor and the drum 12. Such a coupling is shown in U. S. Patent No. 2,621,494 to E. D. Cross. Operation of the switching tube 9 is controlled by contactor 6*a* in the cathode circuit of the switching tube 9. Unless the cathode of the switching tube 9 is grounded by switch 6*a***, the tube is not capable of conducting and transmitting framing voltages to the framing device X.

Alternatively, as is indicated by the broken line position of switch **7*a*—7*b*, the framing voltage may be applied to a framing relay 8 having a contactor 8*a* in the power circuit to the motor 14. With the switch 7*a* in the broken line position the closing of contactor 6*a* of relay 6 causes the switching tube 9 to energize the framing relay 8 and close contactor 8*a* completing a circuit through the motor 14 between the power terminals A and C'. Should the comparison circuit 10** indicate non-coincidence of the framing pulse and recorder pulse, a cutoff voltage will be applied at terminal *e* and the grid of the switching tube 9 momentarily deenergizing the framing relay 8 and causing contactor **8*a* to open for a period long enough to allow motor 14 to slip one pole and bring the drum toward synchronization with the incoming facsimile signals. While I have briefly described the operation of the comparison circuit 10**, it forms no part of the present invention and is described in greater detail in my United States Patent No. 2,686,832.

The automatic start-stop circuit comprising parts 1 to 6 of Fig. 1 is illustrated schematically in Fig. 2. In this circuit the tubes may be type 6SN7. Conventional anode, cathode and grid resistors and coupling condensers are not identified since their use is conventional and well known to those skilled in the art. The first stage C1, the clipping stage, is connected as a diode. Voltage dropping resistors R1 and R2 connected between the B+ supply and ground hold terminal *a'* and the cathode of the clipper positive with respect to its anode so that it conducts only on a high positive pulse. The composite facsimile signals **3*a*** including the framing pulse *b* and the video or picture signals *s* are applied in positive phase at the input terminal *a* and coupled to the anode of the clipper. Only a small portion of the pulse *b* above the cathode bias level is passed by the diode V1. The small positive pulse **3*a'*** appearing at terminal *a'* is coupled to the grid of an amplifier-inverter V2. In this and two subsequent amplifying stages V3 and V4, the clipped framing pulse is amplified and appears at the output of the amplifier section 2 as a large negative pulse **3*b***. A voltage divider, comprising resistors R3 and R4 connected between a negative voltage supply B— and ground, holds the grid of the third amplifier V4 somewhat below cutoff so as to pass the positive amplified framing pulse applied to the grid, but removes any video signals which may have passed through the clipping diode V1.

The negative pulse **3*b* is then passed through a coupling stage V5, connected as a diode, and applied to a one-cycle multivibrator 3 comprising two triodes V6 and V7. Positive grid bias applied through resistor R7 from the B+ supply to the grid of tube V7 holds tube V7 normally conducting. Plate current drawn through the common cathode resistor R11 holds the cathode of tube V6 positive with respect to its grid. This bias is offset by a potential at the junction of voltage dividers R5 and R6 which holds the grid of tube V6 sufficiently positive so that the tube is briefly cut off and will respond to a drop in its cathode voltage by conducting quickly. The amplified negative pulse, coupled by the diode 5, is applied to the grid of V7 thereby cutting tube V7 off, reducing the plate current through the common cathode resistor R11 thereby dropping the voltage at the cathode of tube V6 and causing it to conduct. Current through the grid resistor R7 tends to build up the voltage on the grid of tube V7. Resistor R7 and capacitor C1, however, form a time constant circuit 31** which delays return of the grid of the tube V7 above cut off for an interval of approximately one-half to three-quarters the length of the period T between framing pulses *p*. As soon as tube V7 returns above cutoff, plate current drawn through the common resistor R11 abruply cuts off tube V6. The resulting square wave voltage at the multivibrator output terminal *c* is shown at **3*c* of Fig. 3. This voltage is coupled through a resistor R8 to the grid of the control tube 5. The control tube 5 is normally cut off by a negative potential derived from voltage dividing resistors R9 and R10 connected to a negative supply B—. The resistor R10 and a capacitor C2 comprise an integrating network 4. The integrating network 4 has a time constant of approximately one second, much longer than the period of the square wave voltage 3*c*, thus transforming the square wave voltage 3*c* into a substantially constant D. C. voltage 3*d* as shown in Fig. 3. The control voltage 3*d*** is produced as soon as the first framing pulse *p* initiates operation of the multivibrator 3 and continues so long as framing pulses are transmitted. The integrated control voltage **3*d* is sufficient to overcome the negative bias at the grid of the control tube 5 and causes it to conduct continuously so long as the multivibrator is triggered. The control relay 6 is thus energized by the automatic start-stop circuit of Fig. 2 as soon as framing pulses are received and remains energized so long as the framing pulses recur substantially regularly. Should faulty operation at the transmitter result in omission of two or three framing pulses from the facsimile signals, the integrator 4 will maintain the control voltage 3*d* sufficiently high to hold the control tube 5 above cutoff, although the control voltage will diminish somewhat. As has previously been explained, when the relay 6 is energized a power circuit is completed to the helix drum motor 14** in one of several ways suggested by the alternate arrangements of Fig. 1.

While I have illustrated the automatic starting and stopping of the helix drum motor in response to repeated framing pulses, it should be understood that the principles of the present invention are applicable to the starting of other recorder motors in response to other regularly recurring portions of a facsimile signal. Thus the embodiment shown is for the purpose of illustration only and the present invention includes all modifications and equivalents which fall within the scope of the appended claims.

I claim:

1. In a motor operated recorder receiving facsimile signals including a cyclic pulse recurring at a regular interval, an automatic start-stop circuit comprising a facsimile signal input terminal, connected to said terminal a multivibrator responsive to said cyclic pulse to produce a relatively long pulse, an integrator converting said long pulse into a substantially constant control voltage, means for applying said long pulse to said integrator, relay means operative to complete a power connection to said motor, and connections between said integrator and relay means, whereby when said control voltage is applied to said relay means said motor is caused to start and run so long as said cyclic pulse recurs substantially regularly.

2. In a motor operated recorder receiving facsimile signals including a cyclic pulse recurring at a regular interval, an automatic start-stop circuit comprising a facsimile signal input terminal, connected to said terminal a multivibrator responsive to each cyclic pulse to produce a relatively long pulse having a half cycle which extends a substantial part of said interval, an integrator converting said long pulse into a substantially constant control voltage, means for applying said long pulse to said integrator, relay means operative to complete a power to connection to said motor, and connections between said integrator and relay means, whereby when said control voltage is applied to said relay means said motor is caused to start and run so long as said cyclic pulse recurs substantially regularly.

3. In a motor operated recorder receiving signals including a cyclic pulse recurring at a regular interval, an automatic start-stop circuit comprising a facsimile signal input terminal, connected to said terminal a multivibrator responsive to said cyclic pulse to produce a long pulse, said multivibrator including a time constant circuit having a half cycle which extends a substantial part of said interval, an integrator converting said long pulse into a substantially constant control voltage, means for applying said long pulse to said integrator, relay means operative to complete a power connection to said motor, and connections between said integrator and relay means, whereby when said control voltage is applied to said relay means said motor is caused to start and run so long as said cyclic pulse recurs substantially regularly.

4. In a motor operated recorder receiving signals including a cyclic pulse recurring at a regular interval, an automatic start-stop circuit comprising a facsimile signal input terminal, connected to said terminal a one cycle multivibrator responsive to said cyclic pulse to produce a long pulse having a half cycle which extends a substantial part of said interval, an integrator converting said long pulse into a substantially constant control voltage, means for applying said long pulse to said integrator, relay means operative to complete a power connection to said motor, and connections between said integrator and relay means, whereby when said control voltage is applied to said relay means said motor is caused to start and run so long as said cyclic pulse recurs substantially regularly.

5. In a motor operated line scan recorder receiving facsimile signals including a cyclic pulse with a period recurring at line scan frequency, an automatic start-stop circuit comprising a facsimile signal input terminal, connected to said terminal a multivibrator having a half cycle which extends a substantial part of said period, said multivibrator producing a long pulse, an integrator converting said long pulse into a substantially constant control voltage, means for applying said long pulse to said integrator, relay means operative to complete a power connection to said motor, and connections between said integrator and relay means, whereby said control voltage causes said motor to run so long as said cyclic pulse recur substantially regularly.

6. In a motor operated recorder receiving signals including a cyclic pulse recurring at a regular interval, an automatic start-stop circuit comprising a facsimile signal input terminal, connected to said terminal a multivibrator responsive to said cyclic pulse to produce a relatively long pulse, an integrator converting said long pulse into a substantially constant control voltage, means for applying said long pulse to said integrator, relay means operative to complete a power connection to said motor, and connections between said integrator and relay means, said integrator having a time constant longer than said interval whereby when said control voltage is applied to said relay means said motor is caused to start and run so long as said cyclic pulse recurs substantially regularly.

7. A facsimile recorder receiving signals including a cyclic pulse, comprising a motor, a source of power therefor, relay means operative to complete a connection between said source and motor, an input terminal for said signals, a multivibrator connected to said terminal producing a long pulse in response to said cyclic pulse, an integrator converting said long pulse into a substantially constant control voltage, connections from said multivibrator to said integrator, and connections for applying said control voltage from said integrator to said relay means to operate said relay means whereby said control voltage is applied to said relay means said motor is caused to start and run so long as said cyclic pulse recurs substantially regularly.

8. In a motor operated recorder of facsimile signals including a cyclic pulse recurring at a regular interval, an automatic start-stop circuit comprising a facsimile signal input terminal, connected to said terminal a multivibrator responsive to said cyclic pulse to produce a relatively long pulse, an integrator converting said long pulse into a substantially constant control voltage, means for applying said long pulse to said integrator, relay means operative to complete a power connection to said motor, connections between said integrator and relay means, whereby when said control voltage is applied to said relay means said motor is caused to start and run so long as said cyclic pulse recurs substantially regularly, and framing means responsive to said cyclic pulse to synchronize the phase of said motor with said signals including switching means controlling the phase of said motor, said relay means including a switch connected to said switching means to render said framing and switching means effective only when said motor is caused to run.

9. In a motor operated recorder of facsimile signals including a relatively short pulse recurring at a regular interval, an automatic start-stop circuit comprising a facsimile signal input terminal, connected to said terminal a multivibrator producing a relatively long pulse, an integrator converting said long pulse into a substantially constant control voltage, means for applying said long pulse to said integrator, relay means operative to complete a power connection to said motor, connections between said integrator and relay means, whereby when said control voltage is applied to said relay means said motor is caused to start and run so long as the first said pulse recurs substantially regularly, and framing means responsive to said cyclic pulse to synchronize the phase of said motor with said signals, including an electronic switching valve controlling the phase of said motor and having at least two control electrodes and an output electrode, said output electrode being connected in said power connection and said control electrodes being connected to said framing means and relay means respectively, whereby said framing means is rendered effective only when said motor is caused to run.

10. A recorder of facsimile signals including picture signals and a cyclic pulse, comprising a stationary electrode, a cooperative moving electrode, a motor for driving said moving electrode, a facsimile signal input terminal, connected to said terminal, a multivibrator responsive to said cyclic pulse to produce a relatively long pulse, an integrator converting said long pulse into a control voltage, means for applying said long pulse to said integrator, a relay connected to said integrator and operated by said control voltage, said relay means having a first switch for supplying power to said motor to start the motor and drive said moving electrode so long as the first said pulses recur substantially regularly, a picture signal channel interconnecting said terminal and stationary electrode to apply the picture signals thereto, framing means responsive to said cyclic pulse to produce momentary signals for correcting the phase difference between said moving electrode and the picture signals applied to the stationary electrode, said framing means including a control tube having a control grid receiving said momentary signals and an anode and cathode, and said relay means having a second switch in series with said anode and cathode, said second switch being opened by said relay means in the absence of a regularly recurring cyclic pulse thereby to render said control tube non-conductive and said framing means ineffective when said moving electrode is not driven by said motor.

11. In a motor operated recorder receiving transmitted facsimile signals including portions recurring during transmission at regular intervals, an independent automatic start-stop circuit comprising a power circuit for said motor, a signal channel carrying said facsimile signals, a control channel connected directly to said signal channel so as to receive said facsimile signals so long as they recur, said control channel including means responsive to each of said recurring portions to convert it into a substantially constant control voltage, and relay means connected to said responsive means and controlled by said voltage to complete a power connection in said motor circuit so long as said portions recur substantially regularly.

12. In a motor operated recorder receiving transmitted facsimile signals including portions recurring during transmission at regular intervals, an automatic start-stop circuit comprising a power circuit for said motor, a signal channel carrying said facsimile signals, a control channel connected directly to said signal channel so as to receive said facsimile signals so long as they recur, said control channel including means responsive to each of said recurring portions to convert it into a substantially constant control voltage, relay means connected to said responsive means and controlled by said voltage to complete a power connection to said motor so long as said portions recur substantially regularly, and a framing channel connected to said signal channel for synchronizing the phase of said motor with said recurring portions after said motor is started by said control channel.

References Cited in the file of this patent

UNITED STATES PATENTS

| | | |
|---|---|---|
| 2,616,963 | Ridings | Nov. 4, 1952 |
| 2,640,874 | McConnell | June 2, 1953 |
| 2,686,832 | Fricks | Aug. 17, 1954 |